(12) United States Patent
Kaneko

(10) Patent No.: US 12,109,877 B2
(45) Date of Patent: Oct. 8, 2024

(54) VEHICLE LID OPENING/CLOSING DEVICE

(71) Applicant: TOYODA GOSEI CO., LTD., Kiyosu (JP)

(72) Inventor: Kenichiro Kaneko, Kiyosu (JP)

(73) Assignee: TOYODA GOSEI CO., LTD., Aichi-pref. (JP)

(*) Notice: Subject to any disclaimer, the term of this patent is extended or adjusted under 35 U.S.C. 154(b) by 90 days.

(21) Appl. No.: 17/977,431

(22) Filed: Oct. 31, 2022

(65) Prior Publication Data

US 2023/0135036 A1    May 4, 2023

(30) Foreign Application Priority Data

Nov. 3, 2021   (JP) .................. 2021-179897

(51) Int. Cl.
    *B60K 15/05*    (2006.01)
(52) U.S. Cl.
    CPC ........ *B60K 15/05* (2013.01); *B60K 2015/053* (2013.01)
(58) Field of Classification Search
    CPC .................. B60K 15/05; B60K 2015/053
    USPC ....................................... 296/97.22
    See application file for complete search history.

(56) References Cited

U.S. PATENT DOCUMENTS

| | | | |
|---|---|---|---|
| 10,513,174 | B2 | 12/2019 | Watanabe |
| 2018/0236870 | A1 | 8/2018 | Watanabe |

FOREIGN PATENT DOCUMENTS

| | | | |
|---|---|---|---|
| DE | 102020115360 A1 | * | 12/2020 |
| JP | S61-160321 A | | 7/1986 |
| JP | H08-198020 A | | 8/1996 |
| JP | 2015-199421 A | | 11/2015 |
| JP | 2017-047827 A | | 3/2017 |

OTHER PUBLICATIONS

DE-102020115360-A1 (Seemann et al.) (Dec. 12, 2020) (Machine Translation) (Year: 2020).*
Office Action dated Aug. 6, 2024 issued for the corresponding Japanese Patent Application No. 2021-179897 (and English translation).

* cited by examiner

*Primary Examiner* — Mahmoud Gimie
(74) *Attorney, Agent, or Firm* — Posz Law Group, PLC

(57) ABSTRACT

A vehicle lid opening/closing device includes: a base portion mounted on a vehicle body; an opening exposing a supply port for supplying energy to a vehicle; a lid closing the opening; and a link mechanism opening/closing the lid between predetermined closed and opened positions. The link mechanism includes first and second arms each rotatably supported at one end portion thereof by the base portion and at another end portion thereof by the lid. The second arm rotates in synchronization with rotation of the first arm and is positionable in a rotation trajectory of the first arm when seen in a thrust direction. The first and second arms respectively have overlap portions overlapping each other in the thrust direction at the lid opened position, and stopper portions coming into contact with each other in a rotation direction at the lid opened position to restrict further opening of the lid.

18 Claims, 8 Drawing Sheets

VEHICLE LID OPENING/CLOSING DEVICE

TECHNICAL FIELD

The present invention relates to a vehicle lid opening/closing device which is mounted on a vehicle.

BACKGROUND ART

Hitherto, for example, a slide-opening/closing type vehicle lid opening/closing device has been known (for example, JP2015-199421 (A)). This vehicle lid opening/closing device includes a base portion, a lid, and a link mechanism. A vehicle has a supply port for supplying energy to a vehicle. The above base portion is a box body that is mounted on a vehicle body, and has an opening for exposing the supply port. The lid is a lid member that closes the opening of the base portion. The link mechanism opens and closes the lid which closes the opening.

The above link mechanism has two arms that connect the base portion and the lid. Base portion-side end portions of the two arms are vertically aligned with each other and rotatably supported by the base portion. In addition, lid-side end portions of the two arms are vertically aligned with each other and rotatably supported by the lid. In the vehicle lid opening/closing device, by synchronously rotating the two arms when opening/closing the lid, the lid is opened/closed between a closed position at which the opening of the base portion is closed and a fully-opened position at which the opening is opened, in a state where the lid is kept parallel to a vehicle body surface. Therefore, a large clearance is ensured in front of the supply port at the fully-opened position of the lid.

SUMMARY OF INVENTION

Technical Problem

However, in the vehicle lid opening/closing device described in JP2015-199421 (A), each of the two arms is formed in a thin plate shape. Therefore, at the fully-opened position of the lid, each arm is likely to rattle, and the arm rigidity against an external force is low.

Meanwhile, if the size of each arm is increased or a high-rigidity material is used as the material of each arm, the arm is less likely to rattle at the fully-opened position of the lid, and the arm rigidity is increased, but the following inconveniences arise. Specifically, if the size of each arm is increased, the movable range of each arm for opening/closing the lid between the closed position and the fully-opened position is limited, and the clearance in front of the supply port at the fully-opened position of the lid becomes smaller. In addition, if a high-rigidity material is used as the material of each arm, the manufacturing cost increases.

The present invention has been made in view of such a problem, and an object of the present invention is to provide a vehicle lid opening/closing device capable of improving arm rigidity against an external force at a fully-opened position of a lid, while ensuring a large clearance in front of a supply port at the fully-opened position of the lid, without any structural change to each arm.

Solution to Problem

An aspect of the present invention is directed to a vehicle lid opening/closing device including: a base portion mounted on a vehicle body; an opening provided in the base portion and configured to expose a supply port for supplying energy to a vehicle; a lid configured to close the opening; and a link mechanism configured to open/close the lid between a predetermined closed position at which the opening is closed and a predetermined opened position at which the opening is opened, wherein the link mechanism includes a first arm rotatably supported at one end portion thereof by the base portion and rotatably supported at another end portion thereof by the lid, and a second arm rotatably supported at one end portion thereof by the base portion, rotatably supported at another end portion thereof by the lid, configured to rotate in synchronization with rotation of the first arm, and positionable in a rotation trajectory of the first arm when seen in a thrust direction, and the first arm and the second arm respectively have overlap portions configured to overlap each other in the thrust direction at the predetermined opened position of the lid, and stopper portions configured to come into contact with each other in a rotation direction at the predetermined opened position of the lid to restrict further opening of the lid.

In this configuration, the overlap portions of the two arms overlap each other in the thrust direction at the predetermined opened position of the lid. Therefore, the movable range of each arm for opening/closing the lid between the fully-closed position and the fully-opened position is widened, and the clearance in front of the supply port at the predetermined opened position of the lid is increased. In addition, further opening of the lid is restricted by the stopper portions of the two arms coming into contact with each other in the rotation direction at the predetermined opened position of the lid, and even when an external force is applied to the arms in the rotation direction in which the two arms approach each other, deformation in the rotation direction of the arms is suppressed by the arms coming into contact with each other to be integrated with each other. Therefore, the rigidity of the arms against an external force at the predetermined opened position of the lid is improved. In this respect, structural changes, such as increasing the size of each arm and increasing the rigidity of the material of each arm, are unnecessary to improve the rigidity of each arm against an external force at the predetermined opened position of the lid.

DESCRIPTION OF EMBODIMENTS

Hereinafter, a specific embodiment of the vehicle lid opening/closing device according to the present invention will be described with reference to FIG. 1 to FIG. 14.

A vehicle lid opening/closing device 1 of one embodiment (hereinafter, referred to simply as a lid opening/closing device 1; see FIG. 1, etc.) is a device for opening/closing a lid that closes an opening provided in a vehicle body. The lid opening/closing device 1 is mounted on a vehicle such as a gasoline vehicle, a diesel vehicle, an electric vehicle, and a hybrid vehicle.

Figure 1:
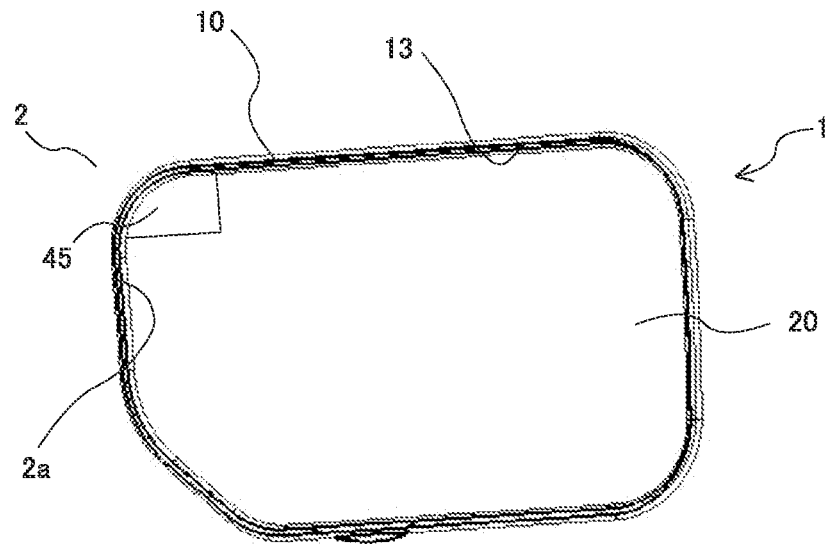
FIG. 1 is a perspective view illustrating a lid-closed state after a vehicle lid opening/closing device according to an embodiment of the present invention is mounted on a vehicle body.
Figure 2:
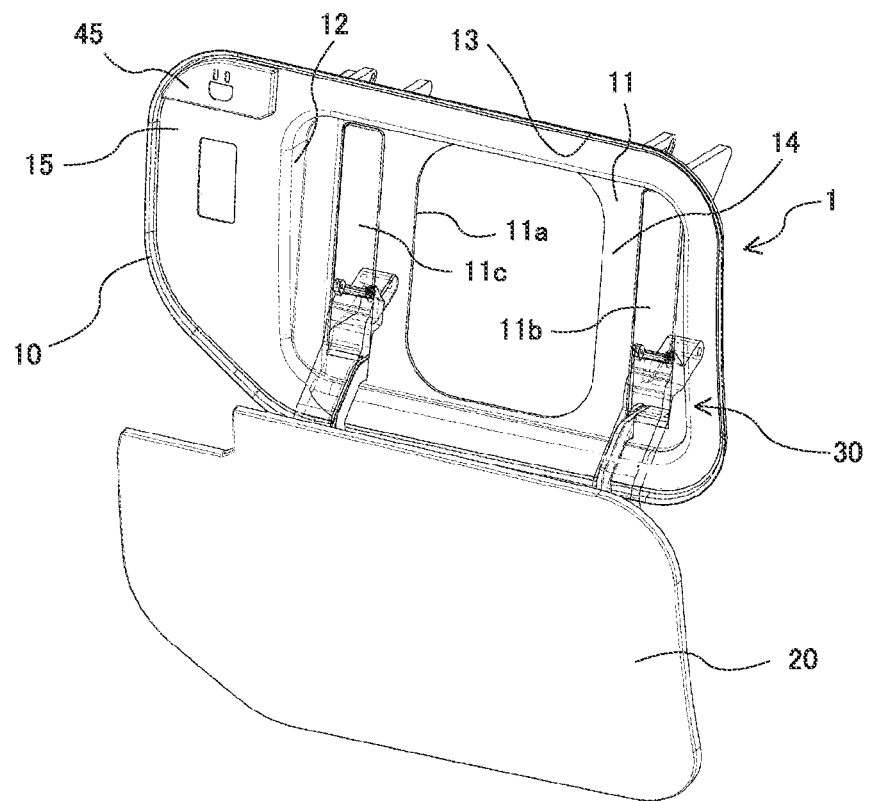
FIG. 2 is a perspective view illustrating a lid-opened state of the vehicle lid opening/closing device of the embodiment (note that two arms of a link mechanism are shown translucently)
Figure 3:
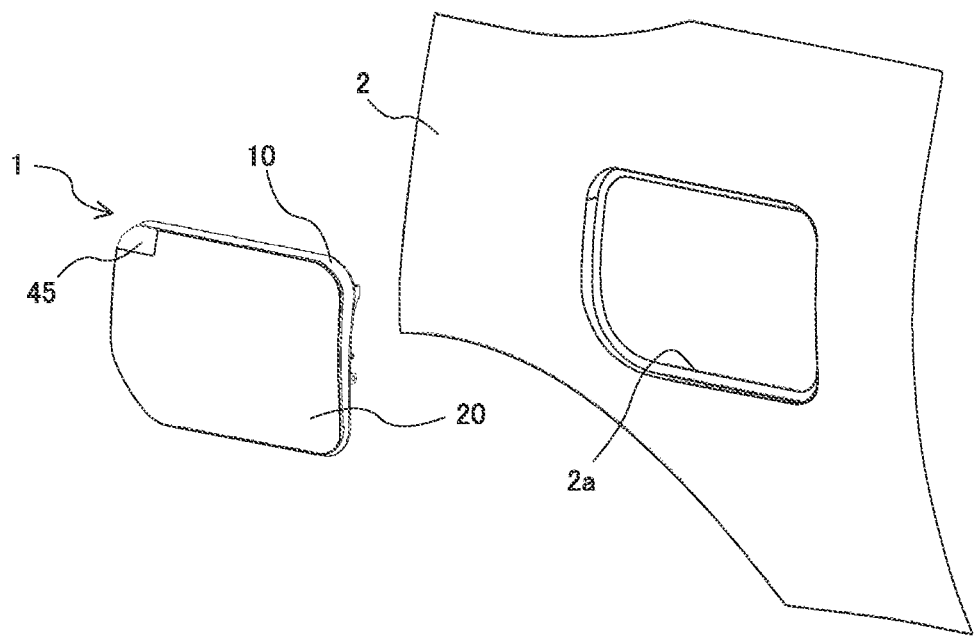
FIG. 3 illustrates a state before the vehicle lid opening/closing device of the embodiment is mounted on the vehicle body.

As shown in FIG. 1, FIG. 2, and FIG. 3, the vehicle has a vehicle body opening 2a which penetrates a vehicle body 2 between the inside and the outside thereof. The vehicle body opening 2a is an opening in which a supply port (not shown) for supplying energy to the vehicle is disposed. The vehicle body opening 2a and the supply port are provided in a vehicle body side surface, a vehicle body front surface, or the like.

The supply port is a fuel filler opening for refueling or a charging port for battery charging. The supply port is disposed in the vehicle body opening 2a so as to be exposed to the outside of the vehicle body in a lid-opened state. The supply port is provided at an end of a fuel filler pipe or a wire. The other end of the fuel filler pipe or the wire is connected to a fuel tank, a battery, or the like disposed on the depth side of the vehicle body (that is, on the inner side of the vehicle body). The supply port may be covered with a cap that serves to protect the supply port from dust and water and is opened/closed by an operator. A refueling gun, a charging gun, or the like for supplying energy is connectable to the supply port in a cap-opened state.

The lid opening/closing device 1 includes a base portion 10, an opening 13, a lid 20, and a link mechanism 30.

The base portion 10 is a box-like inlet box in which the supply port is housed. The base portion 10 is mounted on the vehicle body 2 so as to be fitted into the vehicle body opening 2a. The base portion 10 has a bottom wall portion 11 and a side wall portion 12. The bottom wall portion 11 and the side wall portion 12 form a housing space 14 in which the supply port is housed. The bottom wall portion 11 is, for example, a quadrangular plate-shaped portion. The side wall portion 12 is a wall portion that is erected from an edge portion of the bottom wall portion 11 so as to surround the periphery of the bottom wall portion 11.

The bottom wall portion 11 has a first through hole 11a. The first through hole 11a is a hole for housing the supply port, which is located at the end of the fuel filler pipe or the wire, in the housing space 14. The supply port is exposed to the outside of the vehicle in a state where the supply port is housed in the housing space 14 in the lid-opened state.

The opening 13 is a box opening that is provided in the base portion 10. The opening 13 is provided on a side facing the bottom wall portion 11 across the housing space 14. The opening 13 is opened/closed by the lid 20. The opening 13 is closed when the lid 20 is located at the closed position, and is opened when the lid 20 is not located at the closed position. The opening 13 exposes the supply port in the housing space 14, to the outside of the vehicle when opened. The base portion 10 is mounted on the vehicle body 2 such that the face of the opening 13 faces, for example, in a horizontal direction, or upward obliquely with respect to the horizontal direction. The direction of the face of the opening 13 is not limited thereto, and the face of the opening 13 may face upward or downward.

The base portion 10 has a frame portion 15. The frame portion 15 is formed in an annular shape along a peripheral portion of the opening 13. The frame portion 15 is formed in a flange shape so as to extend from the peripheral portion of the opening 13 toward the frame outside. The base portion 10 is positioned relative to the vehicle body 2 by the back surface of the frame portion 15 coming into contact with a flange surface at the periphery of the vehicle body opening 2a of the vehicle body 2 or the like.

The lid 20 is a lid member that closes the opening 13. The lid 20 is movable to be opened/closed between a predetermined closed position (specifically, a fully-closed position) at which the opening 13 is closed and a predetermined opened position (specifically, a fully-opened position) at which the opening 13 is opened. The lid 20 is supported so as to be rotatable relative to the base portion 10. The lid 20 is opened/closed using a driving force from a lid drive unit 40 described later, without manual operation by the operator. After the lid 20 reaches the fully-opened position by applying the driving force from the lid drive unit 40, the lid 20 may be held at the fully-opened position even if the driving force is no longer applied. The lid 20 may be held at the fully-opened position by the weight of the lid 20 or the biasing force of a spring (not shown).

The lid 20 is formed in a plate shape. The lid 20 is formed in a shape (for example, a substantially rectangular shape) and a size that match the opening 13. The lid 20 closes the opening 13 at the closed position of the lid 20 so as to be flush with the front surfaces of the frame portion 15 and the vehicle body 2 at the periphery of the opening 13. The front surface of the lid 20 may be curved so as to match the front surface of the vehicle body 2.

Figure 4:
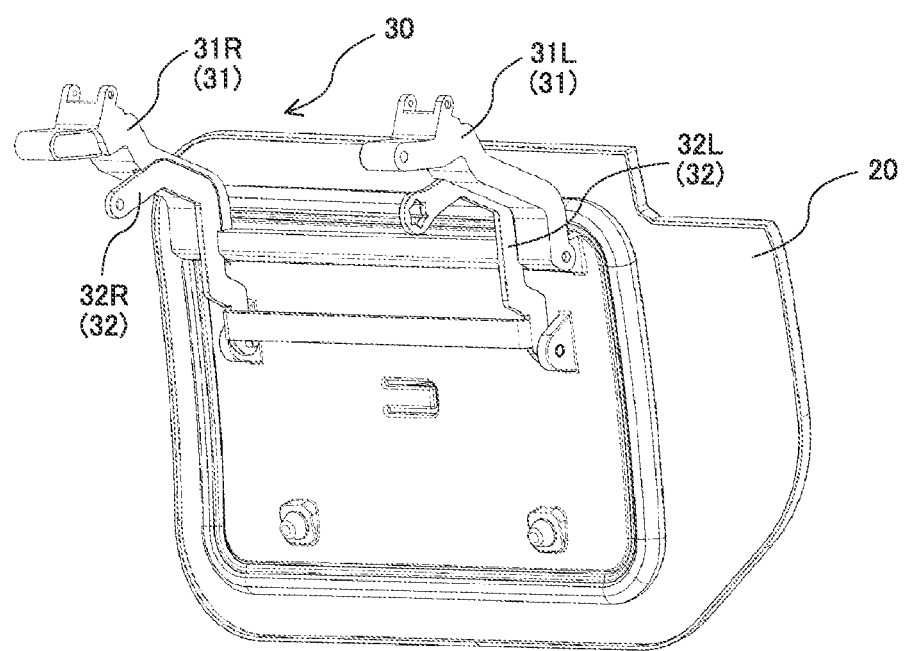
FIG. 4 is a perspective view illustrating a back surface of a lid included in the vehicle lid opening/closing device of the embodiment.

The link mechanism 30 is a mechanism that opens/closes the lid 20 between the fully-closed position and the fully-opened position. The link mechanism 30 is interposed between the base portion 10 and the lid 20. As shown in FIG. 4, the link mechanism 30 has a first arm 31 and a second arm 32. A pair of first arms 31 are provided so as to be spaced apart from each other in the right-left direction when seen from the front side of the lid 20. In addition, a pair of second arms 32 are provided so as to be spaced apart from each other in the right-left direction when seen from the front side of the lid 20.

Hereinafter, the first arm 31 on the right side and the first arm 31 on the left side are respectively referred to as a first arm 31R and a first arm 31L as appropriate, and the second arm 32 on the right side and the second arm 32 on the left side are respectively referred to as a second arm 32R and a second arm 32L as appropriate. The first arm 31R and the first arm 31L are connected to each other via a connection bar or the like. The second arm 32R and the second arm 32L are connected to each other via a connection bar or the like.

The first arms 31 and the second arms 32 are each a member that is rotatably supported at one end portion in an arm longitudinal direction thereof by the base portion 10, is rotatably supported at another end portion in the arm longitudinal direction thereof by the lid 20, and extends in an arm shape. The pair of right and left first arms 31R and 31L have a bilaterally symmetrical shape and rotate in synchronization with each other on the same axis. The pair of right and left second arms 32R and 32L have a bilaterally symmetrical shape and rotate in synchronization with each other on the same axis. The first arms 31 and the second arms 32 cooperate to close/open the lid 20 by rotating in synchronization with each other.

The one end portion of each first arm 31 is supported on a base portion first fulcrum A1 of the base portion 10. The other end portion of each first arm 31 is supported on a lid first fulcrum B1 of the lid 20. Each first arm 31 extends so as to be curved between the base portion first fulcrum A1 and the lid first fulcrum B1. The one end portion of each second arm 32 is supported on a base portion second fulcrum A2 of the base portion 10. The other end portion of each second arm 32 is supported on a lid second fulcrum B2 of the lid 20. Each second arm 32 extends so as to be curved between the base portion second fulcrum A2 and the lid second fulcrum B2.

The base portion first fulcrum A1 and the base portion second fulcrum A2 are provided on the back surface side of the bottom wall portion 11 of the base portion 10. The base portion first fulcrum A1 is provided above the base portion second fulcrum A2. The lid first fulcrum B1 and the lid second fulcrum B2 are provided on the back surface side of the lid 20. The lid first fulcrum B1 is provided above the lid second fulcrum B2. Each first arm 31 is located above each second arm 32. The first arm 31 and the second arm 32 rotate relative to the base portion 10 about different axes corresponding to the fulcrums A1 and A2, and rotates relative to the lid 20 about different axes corresponding to the fulcrums B1 and B2.

The bottom wall portion 11 of the base portion 10 has a second through hole 11b and a third through hole 11c. The second through hole 11b is a hole through which the first arm 31R and the second arm 32R on the right side penetrate. The third through hole 11c is a hole through which the first arm 31L and the second arm 32L on the left side penetrate. The second through hole 11b is provided on the right side of the first through hole 11a. The third through hole 11c is provided on the left side of the first through hole 11a. The second through hole 11b and the third through hole 11c are each formed in a long hole shape extending in the up-down direction so as to permit the first arm 31 and the second arm 32 to rotate during opening/closing of the lid 20.

Figure 5:
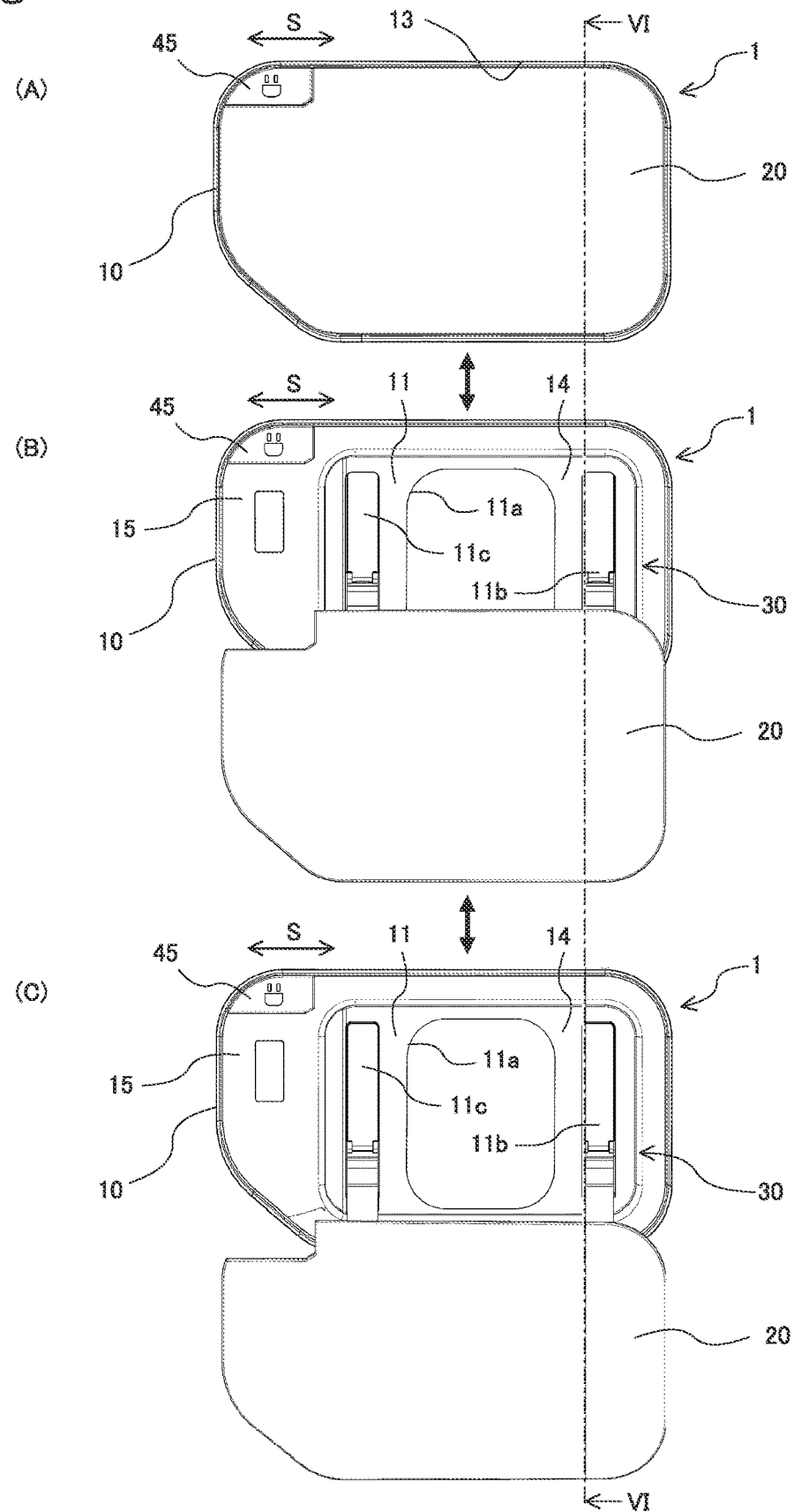
FIG. 5 shows front views illustrating opening/closing of the lid between a lid fully-closed position and a lid fully-opened position in the vehicle lid opening/closing device of the embodiment.
Figure 6:
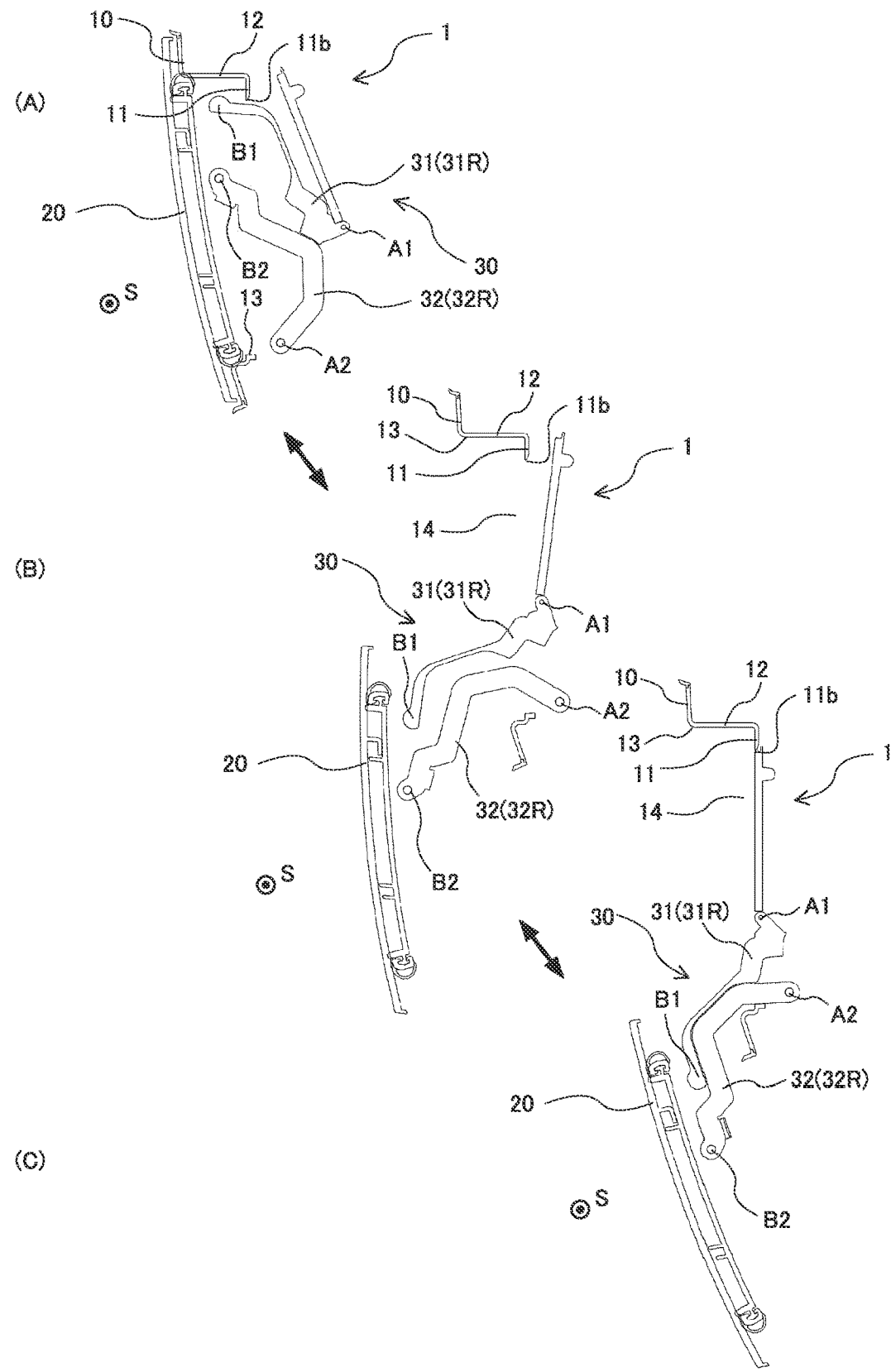
FIG. 6 shows cross-sectional views taken along a line VI-VI shown in FIG. 5.

The first arms 31 and the second arms 32 rotate about the fulcrums A1, A2, B1, and B2 while being maintained in a state of being substantially parallel to each other. In this case, as shown in FIG. 5 and FIG. 6, the lid 20 is opened/closed, while being maintained in a state of being parallel to the face of the opening 13, by the synchronized rotation of the first arms 31 and the second arms 32. The rotation trajectory of each first arm 31 and the rotation trajectory of each second arm 32 overlap each other as seen in a thrust direction S. Each first arm 31 is positionable in the rotation trajectory of the second arm 32 as seen in the thrust direction S, and each second arm 32 is positionable in the rotation trajectory of the first arm 31 as seen in the thrust direction S.

Figure 10:
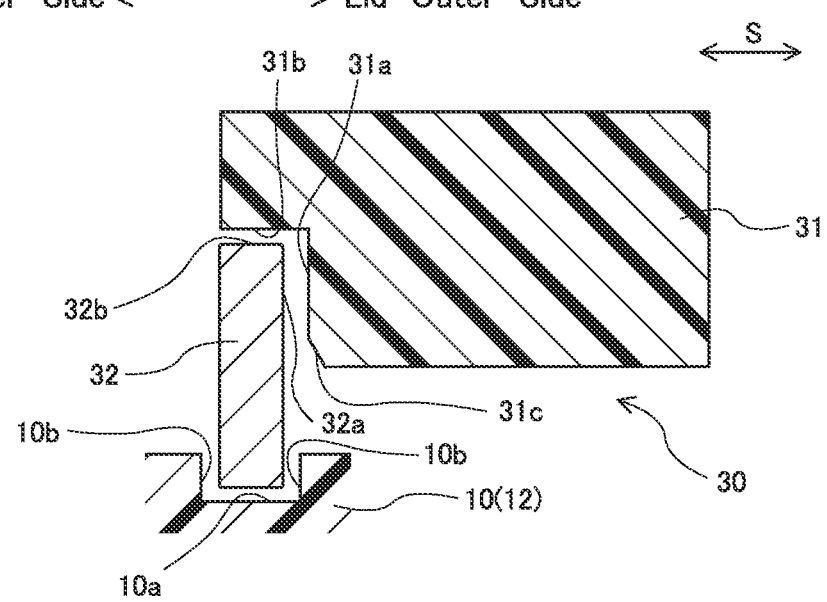
FIG. 10 is an enlarged cross-sectional view of a first arm and a second arm of the link mechanism included in the vehicle lid opening/closing device of the embodiment, as seen from a direction orthogonal to the thrust direction.

As shown in FIG. 10, the first arm 31 is formed in a thick shape such that the thickness in the thrust direction S thereof has a predetermined width. In addition, the second arm 32 is formed in a thin shape such that the thickness in the thrust direction S thereof is smaller. The thrust direction S is a direction orthogonal to the arm longitudinal direction, and is a direction in which the axes corresponding to the fulcrums A1, A2, B1, and B2 extend.

The pair of right and left first arms 31 each have an overlap portion 31a, a stopper portion 31b, and a guide portion 31c. In addition, the pair of right and left second arms 32 each have an overlap portion 32a and a stopper portion 32b.

The overlap portions 31a and 32a are portions that overlap each other in the thrust direction S at the fully-opened position of the lid 20. The overlap between the overlap portions 31a and 32a is achieved between the first arm 31R on the right side and the second arm 32R on the right side and between the first arm 31L on the left side and the second arm 32L on the left side.

The overlap portions 31a and 32a face each other at surfaces that face in the thrust direction S and extend in an arm rotation direction. The overlap portions 31a and 32a begin to overlap each other in the thrust direction S in a partial region thereof before the lid 20 reaches the fully-opened position, in a process in which the lid 20 is opened from the fully-closed position side toward the fully-opened position, and face each other in the entire region thereof when the lid 20 reaches the fully-opened position.

The overlap area of the overlap portions 31a and 32a at the lid fully-opened position is preferably set such that, even when a predetermined external force is applied in the thrust direction S, the overlap portions 31a and 32a withstand the predetermined external force by coming into contact with each other. In addition, the region in the arm longitudinal direction where the overlap portions 31a and 32a overlap each other may be limited to a part in the arm longitudinal direction of each arm 31 or 32 when the lid 20 reaches the fully-opened position, but is preferably the entire region in the arm longitudinal direction of each arm 31 or 32 in order to achieve an increase in the rigidity in the thrust direction S of each arm 31 or 32.

The overlap portions 31a and 32a face each other in the thrust direction S at a predetermined distance or shorter at the fully-opened position of the lid 20. Specifically, the overlap portions 31a and 32a face each other so as to be in contact with each other in the thrust direction S or so as to be spaced apart from each other in the thrust direction S. The predetermined distance may be set to a distance (for example, 1 mm) that allows the arms 31 and 32 to be deformed such that the overlap portions 31a and 32a come into contact with each other when a predetermined external force is applied in the thrust direction S of the arms 31 and 32 at the fully-opened position of the lid 20.

The overlap portion 31a of the first arm 31 is disposed on the lid outer side with respect to the overlap portion 32a of the second arm 32. The overlap portion 31a is formed so as to have an inner plate surface facing the lid inner side of the first arm 31. In addition, the overlap portion 32a is formed so as to have an outer plate surface facing the lid outer side of the second arm 32.

The stopper portions 31b and 32b are portions that restrict further opening of the lid 20 by coming into contact with each other in the arm rotation direction at the fully-opened position of the lid 20. The arm rotation direction is a direction orthogonal to the thrust direction S and particularly includes the up-down direction. The contact between the stopper portions 31b and 32b is made between the first arm 31R on the right side and the second arm 32R on the right side and between the first arm 31L on the left side and the second arm 32L on the left side.

The stopper portions 31b and 32b come into contact with each other at surfaces that face in the arm rotation direction and extend in the thrust direction S. The width of this contact, that is, the width of the second arm 32, is set in consideration of the tolerance and deformation in the thrust direction S of the arms 31 and 32 such that the stopper portions 31b and 32b always come into contact with each other at the fully-opened position of the lid 20. The region in the arm longitudinal direction where the stopper portions 31b and 32b come into contact with each other may be limited to a part in the arm longitudinal direction of each arm 31 or 32 when the lid 20 reaches the fully-opened position, but is preferably the entire region in the arm longitudinal direction of each arm 31 or 32 in order to make both arms 31 and 32 more integrated to increase the rigidity thereof.

The stopper portions 31b and 32b face each other in the arm rotation direction at a predetermined distance or shorter at the fully-opened position of the lid 20. Specifically, the stopper portions 31b and 32b face each other so as to be in contact with each other in the arm rotation direction or so as to be spaced apart from each other in the arm rotation direction. The predetermined distance may be set to a distance (for example, 0.5 mm) that allows the arms 31 and 32 to be deformed such that the stopper portions 31b and 32b come into contact with each other when a predetermined external force is applied in the arm rotation direction at the fully-opened position of the lid 20.

The stopper portion 31b of the first arm 31 is disposed on the upper side with respect to the stopper portion 32b of the second arm 32. The stopper portion 31b is formed so as to have a lower surface facing the lower side of the first arm 31. In addition, the stopper portion 32b is formed so as to have an upper surface facing the upper side of the second arm 32.

As shown in FIG. 10, the first arm 31 may have a space that is cut out in a step shape on a cut plane orthogonal to the arm longitudinal direction such that the overlap portion 31a and the stopper portion 31b are formed. An upper portion of the second arm 32 enters the space at the fully-opened position of the lid 20 so as to fit thereinto. When the second arm 32 enters the space, the overlap portions 31a and 32a overlap each other in the thrust direction S, the stopper portions 31b and 32b come into contact with each other in the arm rotation direction, and the lid 20 reaches the fully-opened position.

The guide portion 31c of the first arm 31 is a guide that, during opening of the lid 20, guides the overlap portions 31a and 32a of the arms 31 and 32 to shift from a state where the overlap portions 31a and 32a do not face each other in the thrust direction S to a state where the overlap portions 31a and 32a face each other in the thrust direction S, that is, guides the second arm 32 to enter the above space. The guide portion 31c is formed so as to have a flat or curved tapered surface at a corner between the overlap portion 31a and the lower surface of the first arm 31. Even when the first arm 31 and the second arm 32 approach each other in the thrust direction S and interfere with each other due to deformation by an external force during opening of the lid 20, the guide portion 31c allows the second arm 32 to easily escape toward the lid inner side from the first arm 31 and performs the above guidance.

Figure 7:
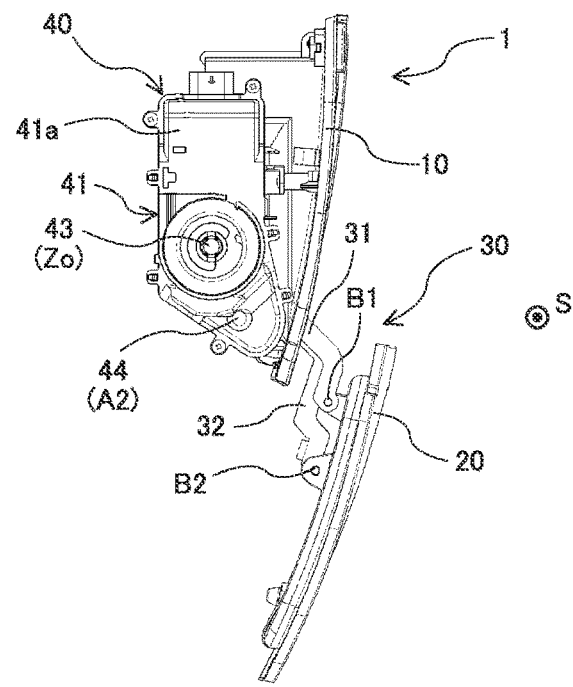
FIG. 7 is a side view illustrating a drive device of the link mechanism which opens/closes the lid in the vehicle lid opening/closing device of the embodiment.

As shown in FIG. 7, the lid opening/closing device 1 includes the lid drive unit 40. The lid drive unit 40 is a part that opens/closes the lid 20 by moving the lid 20 between the fully-closed position and the fully-opened position. The lid drive unit 40 has an electric actuator 41 and a drive mechanism 42 (see FIG. 8).

The electric actuator 41 is an actuator that applies a driving force that opens/closes the lid 20 between the fully-closed position and the fully-opened position, to the lid 20. The electric actuator 41 is an electric motor that generates a driving force when power is supplied thereto. The electric actuator 41 is housed in an actuator box 41a which is mounted and fixed to the base portion 10. The electric actuator 41 is connected directly to an actuator shaft 43 which is rotatable about an output axis Zo, or to the actuator shaft 43 via a speed reducer.

The actuator shaft 43 is formed in a tubular or columnar shape such that a cross-section thereof has, for example, a circular shape or a polygonal shape. The actuator shaft 43 is rotatably supported by the base portion 10. The actuator shaft 43 rotates by the drive of the electric actuator 41. The output axis Zo extends parallel to the axes corresponding to the fulcrums A1, A2, B1, and B2.

The drive mechanism 42 is a link that is interposed between the electric actuator 41 side (specifically, the actuator shaft 43) and the link mechanism 30 side (specifically, the first arm 31 and the second arm 32). The drive mechanism 42 is activated by the rotation of the actuator shaft 43 to transmit the driving force of the electric actuator 41 to the link mechanism 30 side. The drive mechanism 42 has a first link 42a, a second link 42b, and a third link 42c.

The first link 42a, the second link 42b, and the third link 42c are connected in series between the actuator shaft 43 and a lid shaft 44 corresponding to the base portion second fulcrum A2 which is at one end portion of the second arm 32. The lid shaft 44 is formed in a tubular or columnar shape such that a cross-section thereof has, for example, a circular shape or a polygonal shape. The lid shaft 44 is integrated with the third link 42c and also integrated with the one end portion of the second arm 32L. The lid shaft 44 is rotatably supported by the base portion 10 on the base portion second fulcrum A2 of the second arm 32L on the left side.

The first link 42a rotates about the output axis Zo in conjunction with the rotation of the actuator shaft 43. The second link 42b is configured to be connected at one end portion thereof to an outer peripheral portion of the first link 42a and connected at another end portion thereof to an outer peripheral portion of the third link 42c. The second link 42b moves (changes a posture thereof) in conjunction with the rotation of the first link 42a. The third link 42c rotates about the base portion second fulcrum A2 in conjunction with the movement of the second link 42b, and also rotates the second arm 32 about the base portion second fulcrum A2 relative to the base portion 10 by the rotation thereof.

Each of the links 42a, 42b, and 42c is formed in an arm plate shape. In addition, the second link 42b has a first thinned portion 42d and a second thinned portion 42e. The first thinned portion 42d and the second thinned portion 42e are each a portion that is thinned between the output axis Zo and the base portion second fulcrum A2. The first thinned portion 42*d* and the second thinned portion 42*e* each have a surface that is concavely curved by cutting-out into a semi-circular shape.

The first thinned portion 42*d* is provided in order to make the first link 42*a* and the second link 42*b* less likely to interfere with each other at the fully-closed position side of the lid 20 and to widen the range of rotation between these links as compared to the case where there is no such thinned portion. The second thinned portion 42*e* is provided in order to make the second link 42*b* and the third link 42*c* less likely to interfere with each other at the fully-opened position side of the lid 20 and to widen the range of rotation between these links as compared to the case where there is no such thinned portion.

An edge portion of the first thinned portion 42*d* and the outer surface of the actuator shaft 43 come into contact with each other in the vicinity of the fully-closed position of the lid 20 when the actuator shaft 43 rotates in a direction in which the lid 20 is closed. The first thinned portion 42*d* and the actuator shaft 43 restrict the rotation of the first link 42*a* and the movement of the second link 42*b* and position the drive mechanism 42 by coming into contact with each other, thereby restricting closing of the lid 20 beyond the fully-closed position.

An edge portion of the second thinned portion 42*e* and the outer surface of the lid shaft 44 come into contact with each other in the vicinity of the fully-opened position of the lid 20 when the actuator shaft 43 rotates in a direction in which the lid 20 is opened. The second thinned portion 42*e* and the lid shaft 44 restrict the movement of the second link 42*b* and the rotation of the third link 42*c* and position the drive mechanism 42 by coming into contact with each other, thereby restricting opening of the lid 20 beyond the fully-opened position.

The electric actuator 41 selectively generates driving forces in both the direction in which the lid 20 is opened (opening direction) and the direction in which the lid 20 is closed (closing direction). The electric actuator 41 is driven and controlled by a control unit composed mainly of a microcomputer.

An opening switch 45 is operably supported on the base portion 10. When the opening switch 45 is pressed by the operator at the fully-closed position of the lid 20, the control unit supplies power to the electric actuator 41 to cause the electric actuator 41 to generate a driving force in the opening direction of the lid 20. In this case, the lid 20 is opened from the fully-closed position toward the fully-opened position by the driving force of the electric actuator 41. In addition, when the lid 20 reaches the fully-opened position, the control unit controls the electric actuator 41 to stop the rotation.

When an operation of closing the lid 20 is performed by the operator at the fully-opened position of the lid 20, the control unit may supply power to the electric actuator 41 to cause the electric actuator 41 to generate a driving force in the closing direction of the lid 20. In this case, the lid 20 is closed from the fully-opened position toward the fully-closed position by the driving force of the electric actuator 41.

Figure 9:
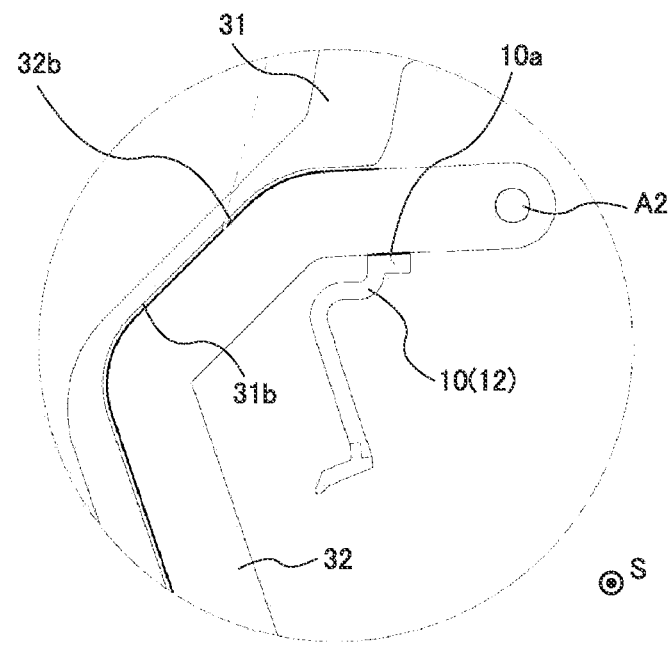
FIG. 9 is an enlarged view of a main part of the link mechanism included in the vehicle lid opening/closing device of the embodiment, as seen from a thrust direction.

The base portion 10 comes into contact with the arms 31 and 32 at the fully-opened position of the lid 20 to position the arms 31 and 32. As shown in FIG. 9 and FIG. 10, the base portion 10 has a first positioning portion 10*a* and a second positioning portion 10*b*.

The first positioning portion 10*a* is an open-side stopper that positions the second arm 32 in the arm rotation direction at the fully-opened position of the lid 20. This positioning restricts further opening of the lid 20 when the second arm 32 comes into contact with the first positioning portion 10*a* or faces the first positioning portion 10*a* with a slight gap. The first positioning portion 10*a* is formed at a portion, of the side wall portion 12 of the base portion 10, which defines the lower side of the housing space 14, so as to have an upper surface that faces upward. The positioning of the second arm 32 by the first positioning portion 10*a* is performed at the second arm 32R on the right side and the second arm 32L on the left side. The region where the second arm 32 is positioned by the first positioning portion 10*a* may be limited to a part in the arm longitudinal direction of the second arm 32 when the lid 20 reaches the fully-opened position.

The second positioning portion 10*b* is an open-side stopper that positions the second arm 32 in the thrust direction S at the fully-opened position of the lid 20. This positioning restricts further movement of the lid 20 in the thrust direction S when the second arm 32 comes into contact with the second positioning portion 10*b* or faces the second positioning portion 10*b* with a slight gap. The second positioning portion 10*b* is formed at the portion, of the side wall portion 12 of the base portion 10, which defines the lower side of the housing space 14, so as to have a surface that faces in the thrust direction S. The positioning of the second arm 32 by the second positioning portion 10*b* is performed at the second arm 32R on the right side and the second arm 32L on the left side. The region where the second arm 32 is positioned by the second positioning portion 10*b* may be limited to a part in the arm longitudinal direction of the second arm 32 when the lid 20 reaches the fully-opened position.

In addition, a pair of second positioning portions 10*b* are provided such that one second arm 32 is located therebetween in the thrust direction S. The pair of second positioning portions 10*b* are provided so as to be spaced apart from each other in the thrust direction S by a distance equal to or larger than the width in the thrust direction S of the second arm 32.

As shown in FIG. 10, the base portion 10 may have a recess groove provided at the portion, of the side wall portion 12 of the base portion 10, which defines the lower side of the housing space 14, such that the first positioning portion 10*a* and the pair of second positioning portions 10*b* are formed. A lower portion of the second arm 32 enters the space in the recess groove at the fully-opened position of the lid 20 so as to fit thereinto. When the second arm 32 enters the recess groove, the second arm 32 is positioned in the arm rotation direction by the first positioning portion 10*a*, the second arm 32 is also positioned in the thrust direction S by the second positioning portions 10*b*, and the lid 20 reaches the fully-opened position.

A guide portion formed so as to have a flat or curved tapered surface may be provided at each upper surface corner of the recess groove in the base portion 10. This guide portion is a guide that guides the second arm 32 to escape into and enter the recess groove also when the second arm 32 moves in the thrust direction S due to deformation by an external force during opening of the lid 20 and interferes with the side wall portion 12.

Figure 8:
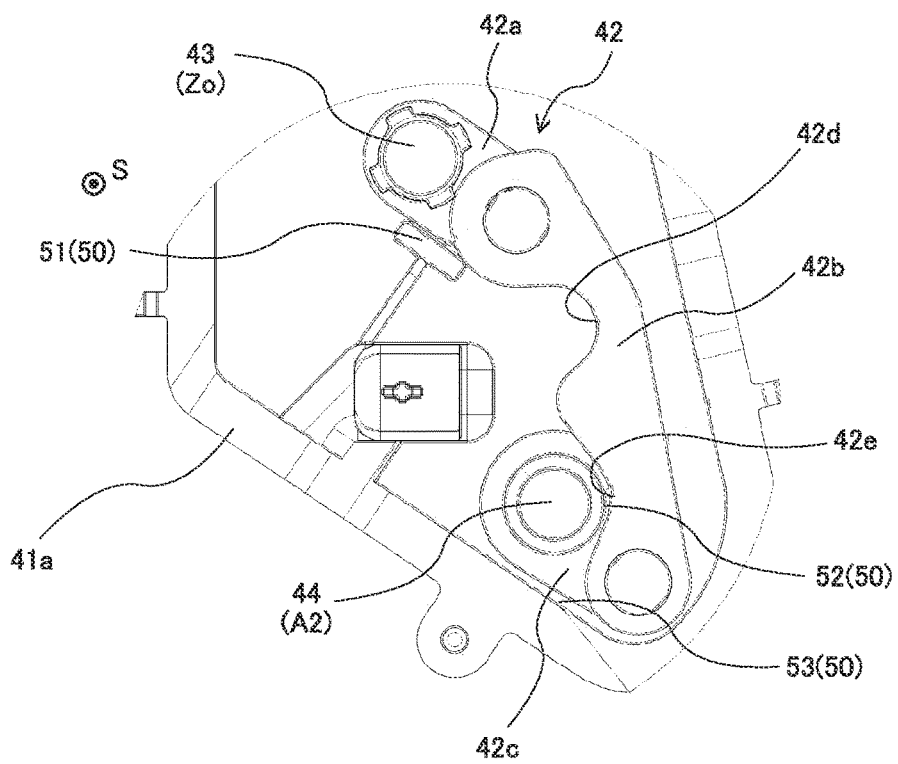
FIG. 8 is an enlarged view of a main part of the drive device shown in FIG. 7.

As shown in FIG. 8, the lid opening/closing device 1 includes a fully-opened positioning portion 50. The fully-opened positioning portion 50 is an open-side stopper that positions the lid 20 at the fully-opened position of the lid 20 and restricts further opening of the lid 20 beyond the fully-opened position. The fully-opened positioning portion 50 is provided in the actuator box 41a separately from the first positioning portion 10a and the second positioning portions 10b.

The fully-opened positioning portion 50 is disposed at a location where the fully-opened positioning portion 50 is brought into contact (surface contact) with a side surface of the first link 42a, the second link 42b, or the third link 42c of the drive mechanism 42 at the fully-opened position of the lid 20. The fully-opened positioning portion 50 has a first portion 51 which is brought into contact with the first link 42a at the fully-opened position of the lid 20, a second portion 52 which is brought into contact with the second link 42b at the fully-opened position of the lid 20, and a third portion 53 which is brought into contact with the third link 42c at the fully-opened position of the lid 20. The contact of the first portion 51, the second portion 52, and the third portion 53 is preferably made substantially at the same time to ensure, when an external force that further opens the lid 20 beyond the fully-opened position is applied, the rigidity sufficient to receive the external force.

Next, the operation of the lid opening/closing device 1 will be described.

During traveling of the vehicle or the like, in the lid opening/closing device 1, the lid 20 is at the fully-closed position at which the opening 13 of the base portion 10 is closed. At the fully-closed position of the lid 20, a supply portion is not exposed to the outside of the vehicle body, so that connecting a refueling gun or a charging gun to the supply portion is impossible.

If, in a state where the lid 20 is at the fully-closed position, the operator such as a vehicle driver and a vehicle user desires to refuel the vehicle or charge a battery, the operator stops the vehicle and performs, on the vehicle, the necessary operation to open the lid 20 to the fully-opened position. This operation includes unlocking to the fully-opened position of the lid 20, and depending on the situation of the operator, examples thereof include: pressing the opening switch 45; approaching the vehicle while carrying a smart key corresponding to the vehicle, and causing the vehicle to perform verification through communication between the vehicle and the carried device; making an opening instruction through an application of a smartphone; pressing an opening switch button provided in the interior of the vehicle; and pulling an opening lever.

When the above operation is performed, the lid 20 is opened from the fully-closed position. Specifically, during the opening process of the lid 20, the electric actuator 41 is activated to generate a driving force for opening the lid 20. The driving force is inputted to the drive mechanism 42 via the actuator shaft 43 on the output axis Zo and transmitted to the lid shaft 44. When the lid shaft 44 rotates due to the transmission of the driving force, each second arm 32 rotates about the base portion second fulcrum A2, and each first arm 31 rotates about the base portion first fulcrum A1 in synchronization with the rotation of the second arm 32.

When the first arm 31 and the second arm 32 rotate relative to the base portion 10 about the fulcrums A1 and A2 in synchronization with each other, the first arm 31 and the second arm 32 rotate relative to the lid 20 about the fulcrums B1 and B2 in synchronization with each other due to the weight of the lid 20, etc. At this time, the lid 20 is opened while being kept parallel to the opening 13 of the base portion 10, by the cooperation of the first arm 31 and the second arm 32.

During the process in which the first arm 31 and the second arm 32 rotate in synchronization with each other and the lid 20 is opened, before the lid 20 reaches the fully-opened position, partial regions of the overlap portions 31a and 32a begin to face each other in the thrust direction S, and eventually, the entire regions of the overlap portions 31a and 32a face each other in the thrust direction S, and the stopper portions 31b and 32b come into contact with each other in the arm rotation direction. Accordingly, the lid 20 reaches the fully-opened position.

As described above, in the lid opening/closing device 1, the lid 20 is opened from the fully-closed position to the fully-opened position by performing the operation of pressing the opening switch 45 or the like to activate the electric actuator 41 of the lid drive unit 40. In addition, the lid 20 is closed from the fully-opened position to the fully-closed position by performing the operation of closing the lid 20 or the like to activate the electric actuator 41 of the lid drive unit 40.

At the fully-opened position of the lid 20, the overlap portions 31a and 32a of the first arm 31 and the second arm 32 overlap each other in the thrust direction S. If the first arm 31 and the second arm 32 rotate until the overlap portions 31a and 32a overlap each other in the thrust direction S, the movable range of each arm for opening/closing the lid 20 between the fully-closed position and the fully-opened position is wider than that in the case where such rotation is impossible, so that the fully-opened position of the lid 20 is moved further to the opening side. Therefore, a large clearance is ensured in front of the supply port at the fully-opened position of the lid 20. Accordingly, interference of a refueling gun or a charging gun with the lid 20 or the like is made difficult when inserting the gun into the supply port, and this insertion is easily performed.

At the fully-opened position of the lid 20, the stopper portions 31b and 32b of the first arm 31 and the second arm 32 come into contact with each other in the arm rotation direction to restrict further opening of the lid 20, and even when an external force is applied to the arms 31 and 32 in the arm rotation direction in which the arms 31 and 32 approach each other, deformation of the arms 31 and 32 in the arm rotation direction is suppressed by the arms 31 and 32 coming into contact with each other to be integrated with each other.

Therefore, the rigidity of the arms 31 and 32 against an external force at the fully-opened position of the lid 20 (particularly, an external force applied in the arm rotation direction in which the arms 31 and 32 approach each other) is improved. In this respect, no structural changes, such as increasing the size of each arm 31 or 32 and increasing the rigidity of the material of each arm 31 or 32, are unnecessary to improve the rigidity of the arms 31 and 32 against an external force in the arm rotation direction at the fully-opened position of the lid 20.

Therefore, in the lid opening/closing device 1, while a large clearance is ensured in front of the supply port at the fully-opened position of the lid 20, the arm rigidity against an external force in the arm rotation direction at the fully-opened position of the lid 20 is improved without any structural change to each arm 31 or 32.

At the fully-opened position of the lid 20, the overlap portions 31a and 32a of the first arm 31 and the second arm 32 face each other in the thrust direction S at a predetermined distance or shorter, and are brought into contact with each other by a predetermined external force applied in the thrust direction S. With this structure, even if an external force is applied to the arms 31 and 32 at the fully-opened position of the lid 20 in the thrust direction S in which the arms 31 and 32 approach each other, deformation of the arms 31 and 32 in the thrust direction S is suppressed by the arms 31 and 32 coming into contact with each other to be integrated with each other.

Therefore, the rigidity of the arms 31 and 32 against an external force at the fully-opened position of the lid 20 (particularly, an external force applied in the thrust direction S in which the arms 31 and 32 approach each other) is improved. In this respect, no structural changes, such as increasing the size of each arm 31 or 32 and increasing the rigidity of the material of each arm 31 or 32, are unnecessary to improve the rigidity of the arms 31 and 32 against an external force in the thrust direction S at the fully-opened position of the lid 20.

Therefore, in the lid opening/closing device 1, while a large clearance is ensured in front of the supply port at the fully-opened position of the lid 20, the arm rigidity against an external force in the thrust direction S at the fully-opened position of the lid 20 is improved without any structural change to each arm 31 or 32.

The first arm 31 has the guide portion 31c which guides the overlap portions 31a and 32a of the arms 31 and 32 to shift from a state where the overlap portions 31a and 32a do not face each other in the thrust direction S to a state where the overlap portions 31a and 32a face each other in the thrust direction S, during opening of the lid 20. With this structure, even when the first arm 31 and the second arm 32 approach each other in the thrust direction S due to deformation by an external force during opening of the lid 20 and interfere with each other at the surfaces that face in the arm rotation direction, the second arm 32 comes into contact with the guide portion 31c of the first arm 31, and easily escapes in the thrust direction S in which both arms 31 and 32 are separated from each other. Therefore, a situation in which, at the lid fully-opened position, the lid 20 does not reach a desired position due to interference between the arms 31 and 32 during opening of the lid 20 is inhibited from occurring.

In the lid opening/closing device 1, the base portion 10 has the first positioning portion 10a which positions the second arm 32 in the arm rotation direction at the fully-opened position of the lid 20. With this structure, further opening of the lid 20 beyond the fully-opened position is restricted, and even when an external force that moves the arms 31 and 32 (particularly, the second arm 32) downward is applied at the fully-opened position of the lid 20, since the second arm 32 comes into contact with the first positioning portion 10a, the arms 31 and 32 are prevented from rattling in the arm rotation direction (specifically, downward).

In the lid opening/closing device 1, the base portion 10 has the second positioning portion 10b which positions the second arm 32 in the thrust direction S at the fully-opened position of the lid 20. With this structure, even when an external force that moves the arms 31 and 32 (particularly, the second arm 32) in the thrust direction S is applied at the fully-opened position of the lid 20, the arms 31 and 32 are prevented from rattling in the thrust direction S, by the second arm 32 coming into contact with the second positioning portion 10b.

In the lid opening/closing device 1, the fully-opened positioning portion 50 which positions the lid 20 at the fully-opened position of the lid 20 is provided. The fully-opened positioning portion 50 is an open-side stopper portion that restricts further opening of the lid 20 beyond the fully-opened position. The fully-opened positioning portion 50 is provided at three locations in the actuator box 41a of the electric actuator 41. Specifically, as the fully-opened positioning portion 50, the first portion 51 which is brought into contact with the first link 42a of the drive mechanism 42, the second portion 52 which is brought into contact with the second link 42b, and the third portion 53 which is brought into contact with the third link 42c, exist.

With this structure, at the fully-opened position of the lid 20, the first portion 51 and the first link 42a come into contact with each other, the second portion 52 and the second link 42b come into contact with each other, and the third portion 53 and the third link 42c come into contact with each other, so that the lid 20 is restricted from being further opened beyond the fully-opened position.

As described above, in the lid opening/closing device 1, the positioning functions for restricting further opening of the lid 20 beyond the fully-opened position are achieved by (1) positioning by control of the electric actuator 41, (2) positioning by the positioning portion 10a and 10b of the base portion 10, (3) positioning by the stopper portions 31b and 32b of the first arm 31 and the second arm 32, and (4) positioning by the fully-opened positioning portion 50. Therefore, sufficient restriction of further opening of the lid 20 beyond the fully-opened position is ensured. Therefore, for example, even when a downward force is applied to the lid 20 at the fully-opened position due to the weights of the lid 20 and the arms 31 and 32 and a downward load, the resistance of the lid 20 is ensured.

To improve the effect of restricting further opening of the lid 20 beyond the fully-opened position, each portion is preferably formed such that the positioning of the above (1) to (4) is achieved substantially at the same time.

In the above embodiment, the first positioning portion 10a and the second positioning portion 10b correspond to "positioning portion" described in the claims.

Meanwhile, in the above embodiment, the guide portion 31c which guides the overlap portions 31a and 32a of the arms 31 and 32 to shift from a state where the overlap portions 31a and 32a do not face each other in the thrust direction S to a state where the overlap portions 31a and 32a face each other in the thrust direction S, during opening of the lid 20, is provided only to the first arm 31 and not provided to the second arm 32. However, the present invention is not limited thereto, and such a guide portion may be provided only to the second arm 32 or may be provided to both the first arm 31 and the second arm 32.

Figure 11:
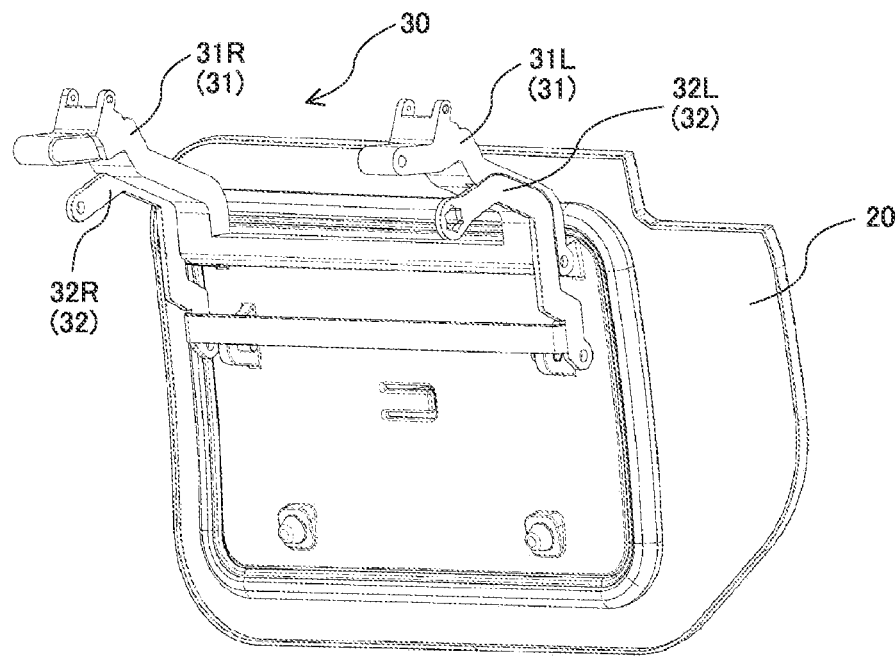
FIG. 11 is a perspective view illustrating a back surface of a lid included in a vehicle lid opening/closing device according to a first modification of the present invention.
Figure 12:
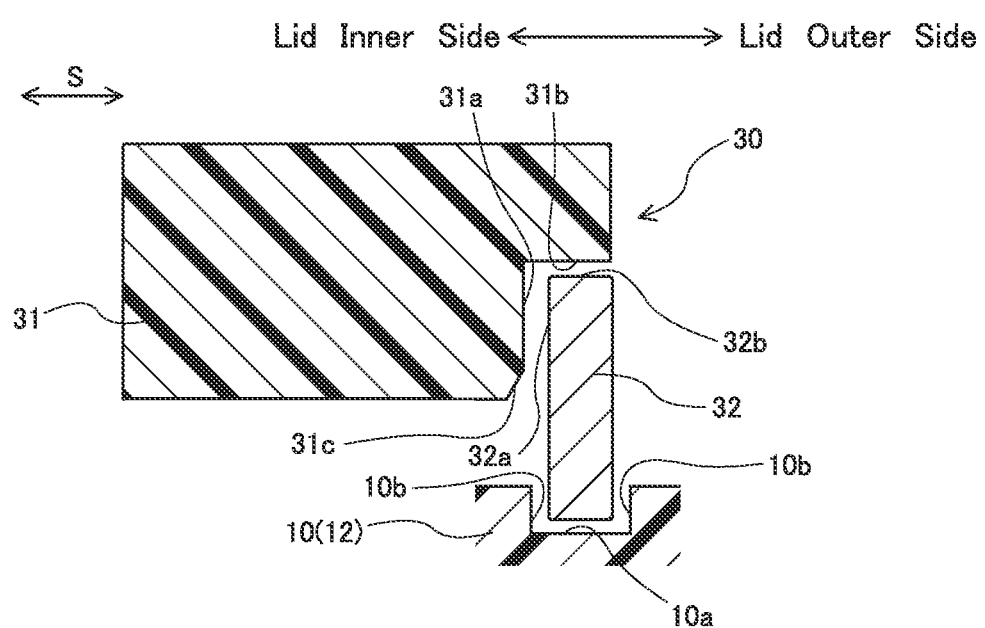
FIG. 12 is an enlarged cross-sectional view of a first arm and a second arm of a link mechanism included in the vehicle lid opening/closing device of the first modification, as seen from a direction orthogonal to a thrust direction.

In the above embodiment, as shown in FIG. 4 and FIG. 10, the overlap portion 31a of the first arm 31 of the link mechanism 30 is disposed on the lid outer side with respect to the overlap portion 32a of the second arm 32. However, the present invention is not limited thereto, and as shown in FIG. 11 and FIG. 12, the overlap portion 31a of the first arm 31 of the link mechanism 30 may be disposed on the lid inner side with respect to the overlap portion 32a of the second arm 32.

Figure 13:
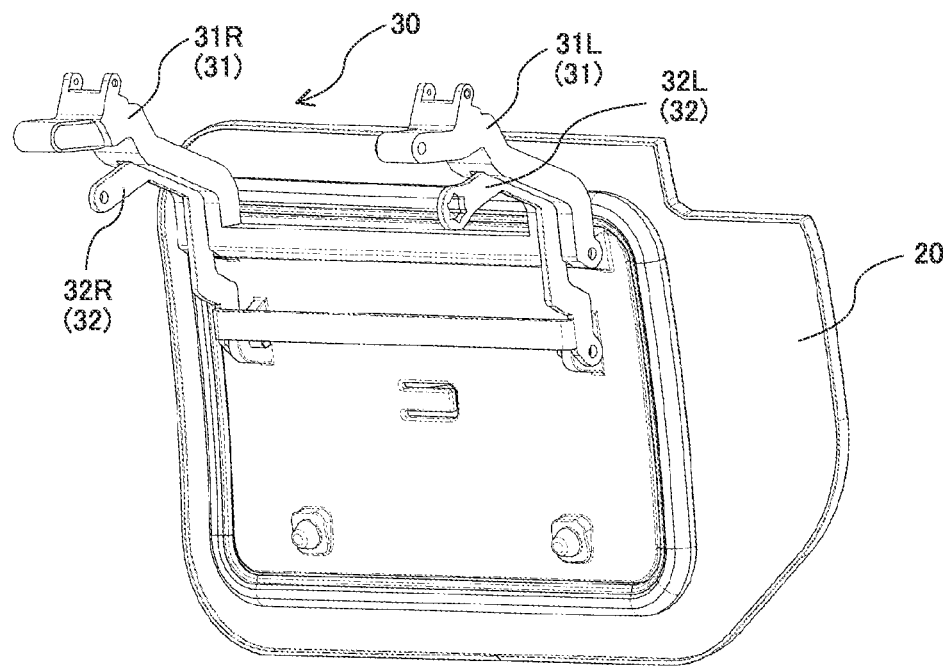
FIG. 13 is a perspective view illustrating a back surface of a lid included in a vehicle lid opening/closing device according to a second modification of the present invention.
Figure 14:
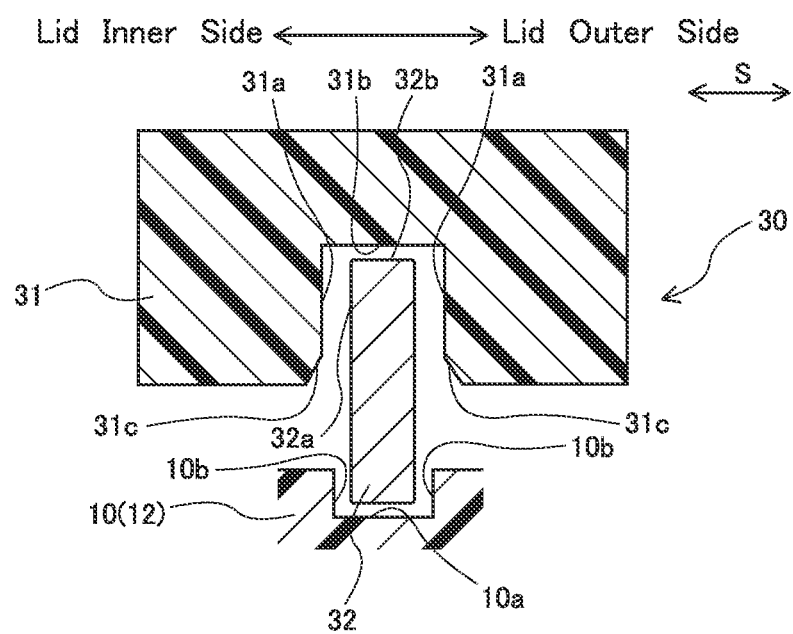
FIG. 14 is an enlarged cross-sectional view of a first arm and a second arm of a link mechanism included in the vehicle lid opening/closing device of the second modification, as seen from a direction orthogonal to a thrust direction.

Furthermore, as shown in FIG. 13 and FIG. 14, the first arm 31 may have a recess groove into which the second arm 32 enters at the lid fully-opened position, and the overlap portion 31a of the first arm 31 of the link mechanism 30 may be disposed on both the lid outer side and the lid inner side with respect to the overlap portion 32a of the second arm 32. With the structure shown in FIG. 13 and FIG. 14, the effect of preventing rattling at the lid fully-opened position is improved, and even when an external force is applied to the arms 31 and 32 at the lid fully-opened position in the thrust direction S in which the arms 31 and 32 approach each other, the stopper portions 31b and 32b do not shift from each other and a state where both stopper portions 31b and 32b face each other is ensured.

In the above embodiment, the lid shaft 44 which rotates when the electric actuator 41 is activated is integrated with one end portion of the second arm 32 disposed below the first arm 31. However, the present invention is not limited thereto, and the lid shaft 44 may be integrated with one end portion of the first arm 31 instead of the one end portion of the second arm 32.

The present invention is not limited to the embodiment and modifications described above, and various changes may be made without departing from the gist of the present invention.

This application claims priority on Japanese Patent Application No. 2021-179897 filed in Japan on Nov. 3, 2021, the entire contents of which are incorporated herein by reference.

The invention claimed is:

1. A vehicle lid opening/closing device comprising:
a base portion mounted on a vehicle body;
an opening provided in the base portion and configured to expose a supply port for supplying energy to a vehicle;
a lid configured to close the opening; and
a link mechanism configured to open/close the lid between a predetermined closed position at which the opening is closed and a predetermined opened position at which the opening is opened, wherein
the link mechanism includes
a first arm rotatably supported at one end portion thereof by the base portion and rotatably supported at another end portion thereof by the lid, and
a second arm rotatably supported at one end portion thereof by the base portion, rotatably supported at another end portion thereof by the lid, configured to rotate in synchronization with rotation of the first arm, and positionable in a rotation trajectory of the first arm when seen in a thrust direction,
the first arm and the second arm respectively have
overlap portions configured to overlap each other in the thrust direction at the predetermined opened position of the lid, and
stopper portions configured to come into contact with each other in a rotation direction at the predetermined opened position of the lid to restrict further opening of the lid,
the overlap portions of the first arm and the second arm face each other in the thrust direction at a predetermined distance or shorter at the predetermined opened position of the lid, and
at least one of the first arm and the second arm has a guide portion configured to guide the overlap portions of the first arm and the second arm from a state where the overlap portions do not face each other in the thrust direction to a state where the overlap portions face each other in the thrust direction, during opening of the lid.

2. The vehicle lid opening/closing device according to claim 1, wherein the base portion has a positioning portion configured to come into contact with the first arm or the second arm at the predetermined opened position of the lid to position the first arm or the second arm.

3. The vehicle lid opening/closing device according to claim 2, wherein the positioning portion has a first positioning portion configured to position the first arm or the second arm in the rotation direction, and a second positioning portion configured to position the first arm or the second arm in the thrust direction.

4. The vehicle lid opening/closing device according to claim 1, further comprising:
an electric actuator, and
a drive mechanism comprising at least one link, wherein the drive mechanism is configured to transmit a driving force from the electric actuator to the link mechanism.

5. The vehicle lid opening/closing device according to claim 1, wherein the lid is maintained parallel to a face of the opening during rotation of the first arm and the second arm.

6. The vehicle lid opening/closing device according to claim 1, wherein a thickness of the first arm in the thrust direction is greater than a thickness of the second arm in the thrust direction.

7. A vehicle lid opening/closing device comprising:
a base portion mounted on a vehicle body;
an opening provided in the base portion and configured to expose a supply port for supplying energy to a vehicle;
a lid configured to close the opening; and
a link mechanism configured to open/close the lid between a predetermined closed position at which the opening is closed and a predetermined opened position at which the opening is opened, wherein
the link mechanism includes
a first arm rotatably supported at one end portion thereof by the base portion and rotatably supported at another end portion thereof by the lid, and
a second arm rotatably supported at one end portion thereof by the base portion, rotatably supported at another end portion thereof by the lid, configured to rotate in synchronization with rotation of the first arm, and positionable in a rotation trajectory of the first arm when seen in a thrust direction,
the first arm and the second arm respectively have
overlap portions configured to overlap each other in the thrust direction at the predetermined opened position of the lid, and
stopper portions configured to come into contact with each other in a rotation direction at the predetermined opened position of the lid to restrict further opening of the lid, and
the base portion has a positioning portion configured to come into contact with the first arm or the second arm at the predetermined opened position of the lid to position the first arm or the second arm.

8. The vehicle lid opening/closing device according to claim 7, wherein the overlap portions of the first arm and the second arm face each other in the thrust direction at a predetermined distance or shorter at the predetermined opened position of the lid.

9. The vehicle lid opening/closing device according to claim 8, wherein at least one of the first arm and the second arm has a guide portion configured to guide the overlap portions of the first arm and the second arm from a state where the overlap portions do not face each other in the thrust direction to a state where the overlap portions face each other in the thrust direction, during opening of the lid.

10. The vehicle lid opening/closing device according to claim 7, further comprising:
an electric actuator, and
a drive mechanism comprising at least one link, wherein the drive mechanism is configured to transmit a driving force from the electric actuator to the link mechanism.

11. The vehicle lid opening/closing device according to claim 7, wherein the lid is maintained parallel to a face of the opening during rotation of the first arm and the second arm.

12. The vehicle lid opening/closing device according to claim 7, wherein a thickness of the first arm in the thrust direction is greater than a thickness of the second arm in the thrust direction.

13. A vehicle lid opening/closing device comprising:
a base portion mounted on a vehicle body:
an opening provided in the base portion and configured to expose a supply port for supplying energy to a vehicle;
a lid configured to close the opening; and
a link mechanism configured to open/close the lid between a predetermined closed position at which the opening is closed and a predetermined opened position at which the opening is opened, wherein
the link mechanism includes
- a first arm rotatably supported at one end portion thereof by the base portion and rotatably supported at another end portion thereof by the lid, and
- a second arm rotatably supported at one end portion thereof by the base portion, rotatably supported at another end portion thereof by the lid, configured to rotate in synchronization with rotation of the first arm, and positionable in a rotation trajectory of the first arm when seen in a thrust direction, the first arm and the second arm respectively have
- overlap portions configured to overlap each other in the thrust direction at the predetermined opened position of the lid, and
- stopper portions configured to come into contact with each other in a rotation direction at the predetermined opened position of the lid to restrict further opening of the lid, the base portion has a positioning portion configured to come into contact with the first arm or the second arm at the predetermined opened position of the lid to position the first arm or the second arm, and the positioning portion has a first positioning portion configured to position the first arm or the second arm in the rotation direction, and a second positioning portion configured to position the first arm or the second arm in the thrust direction.

14. The vehicle lid opening/closing device according to claim 13, wherein the overlap portions of the first arm and the second arm face each other in the thrust direction at a predetermined distance or shorter at the predetermined opened position of the lid.

15. The vehicle lid opening/closing device according to claim 14, wherein at least one of the first arm and the second arm has a guide portion configured to guide the overlap portions of the first arm and the second arm from a state where the overlap portions do not face each other in the thrust direction to a state where the overlap portions face each other in the thrust direction, during opening of the lid.

16. The vehicle lid opening/closing device according to claim 13, further comprising:
an electric actuator, and
a drive mechanism comprising at least one link, wherein the drive mechanism is configured to transmit a driving force from the electric actuator to the link mechanism.

17. The vehicle lid opening/closing device according to claim 13, wherein the lid is maintained parallel to a face of the opening during rotation of the first arm and the second arm.

18. The vehicle lid opening/closing device according to claim 13, wherein a thickness of the first arm in the thrust direction is greater than a thickness of the second arm in the thrust direction.

* * * * *